United States Patent [19]
Foust

[11] Patent Number: 4,851,117
[45] Date of Patent: Jul. 25, 1989

[54] FILTER DEVICE

[76] Inventor: Kenneth A. Foust, P.O. Box 4696, Scottsdale, Ariz. 85261

[21] Appl. No.: 200,565

[22] Filed: May 31, 1988

[51] Int. Cl.$^4$ .............................................. B01D 27/08
[52] U.S. Cl. .................................... 210/236; 210/238; 210/440; 210/443; 210/470; 210/DIG. 17
[58] Field of Search ............... 210/DIG. 17, 232, 236, 210/238, 470, 471, 440, 443, 457

[56] References Cited

U.S. PATENT DOCUMENTS

| | | | |
|---|---|---|---|
| 1,741,705 | 12/1929 | Liddell | 210/443 |
| 2,284,447 | 5/1942 | Redner | 210/238 |
| 2,343,636 | 3/1944 | Bentley | 210/140 |
| 2,657,807 | 11/1953 | Launder | 210/183 |
| 2,728,458 | 12/1955 | Schultz | 210/148 |
| 3,085,688 | 4/1963 | Eberle | 210/440 |
| 4,017,397 | 4/1977 | Copeland | 210/238 |
| 4,052,307 | 10/1977 | Humbert, Jr. | 210/DIG. 17 |
| 4,297,212 | 10/1981 | Padgett | 210/168 |
| 4,338,189 | 7/1982 | Johnson | 210/180 |
| 4,349,438 | 9/1982 | Sims | 210/180 |
| 4,443,334 | 4/1984 | Shugarman | 210/168 |
| 4,767,530 | 8/1988 | Gilliam et al. | 210/236 |

FOREIGN PATENT DOCUMENTS 982464  2/1965  United Kingdom .
1150126 4/1969  United Kingdom .

Primary Examiner—Peter Hruskoci
Assistant Examiner—Christopher Upton
Attorney, Agent, or Firm—Jordan M. Meschkow; Don J. Flickinger; Lowell W. Gresham

[57] ABSTRACT

An engagement member, which is detachably securable to the liquid outlet nipple of a filter receiving fitting, is movably carried by a filter housing which also carries an annular seal which resides against the sealing surface of the fitting. An actuating rod extending from the engagement means is received at one end of a lever which is pivotally secured to the housing. In response to movement of the lever, the housing moves relative the engagement member and the seal is separated from the sealing surface.

15 Claims, 2 Drawing Sheets

U.S. Patent   Jul. 25, 1989   Sheet 1 of 2   4,851,117
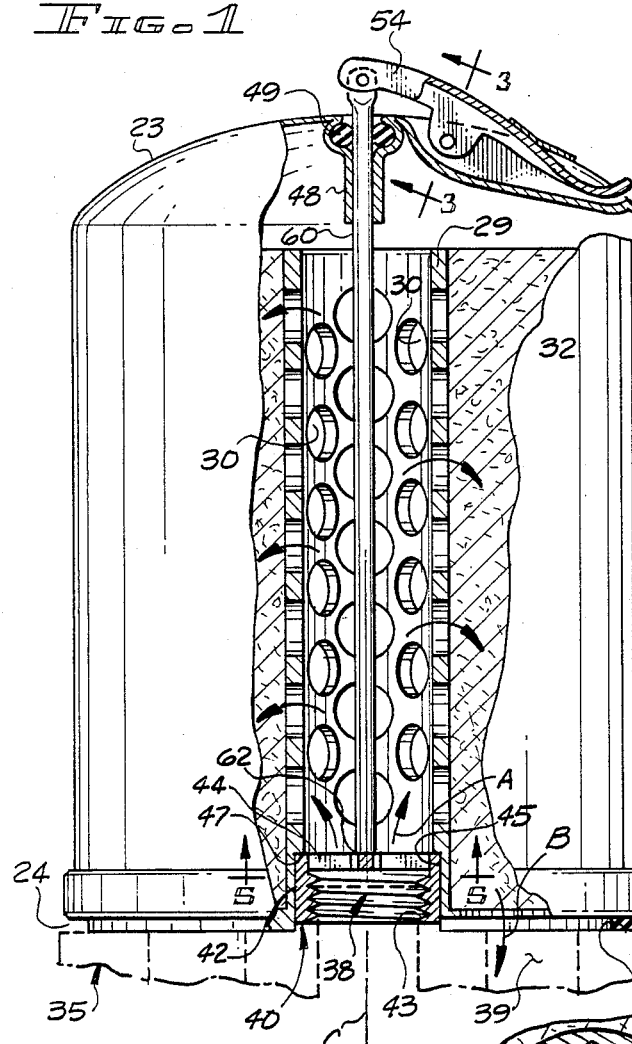
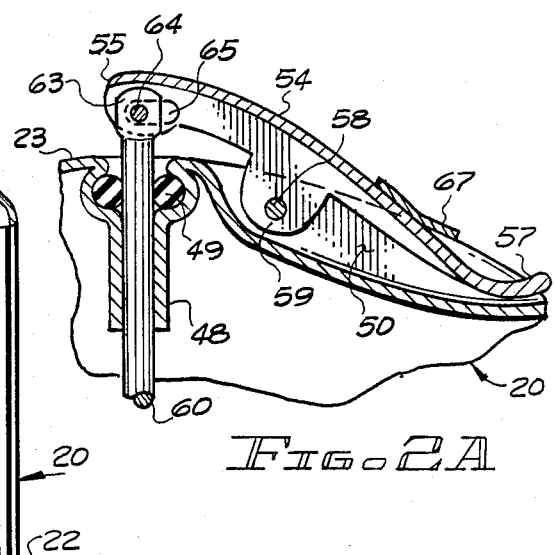
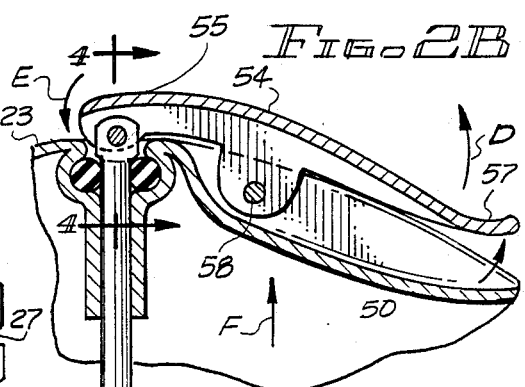
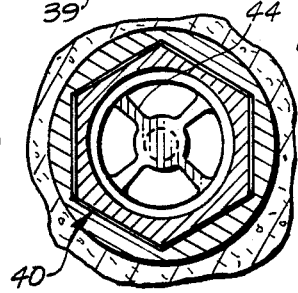
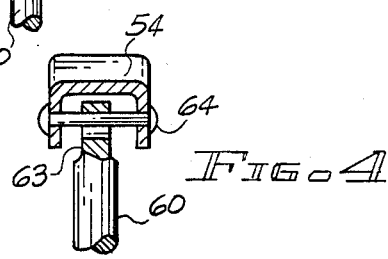
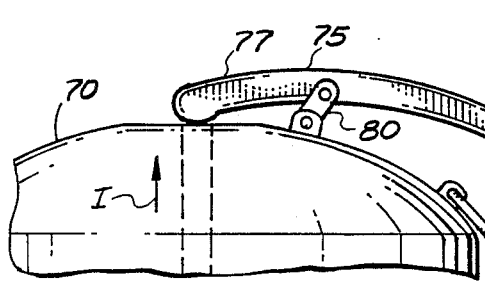
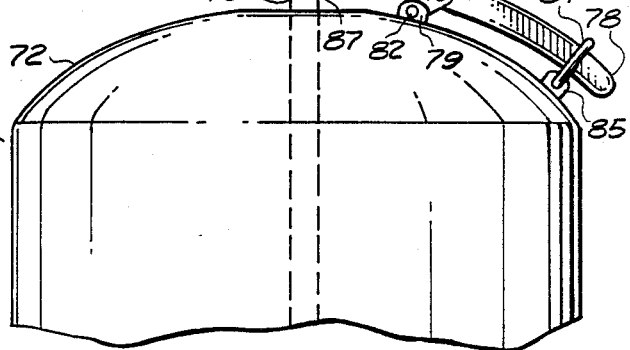

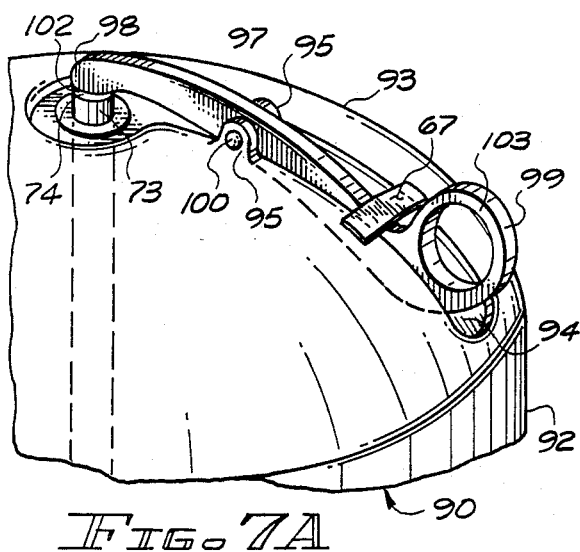
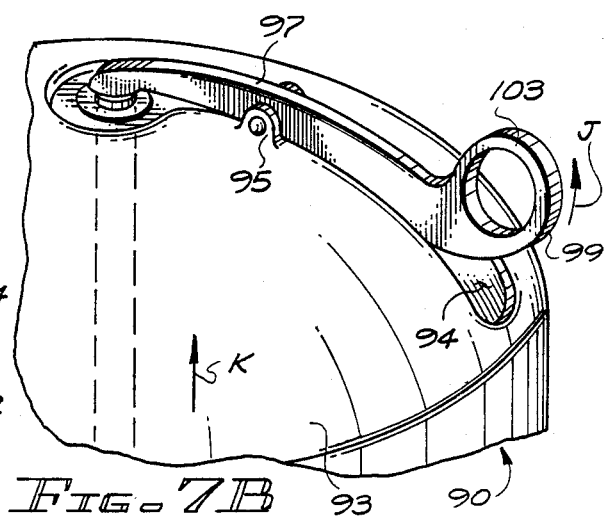
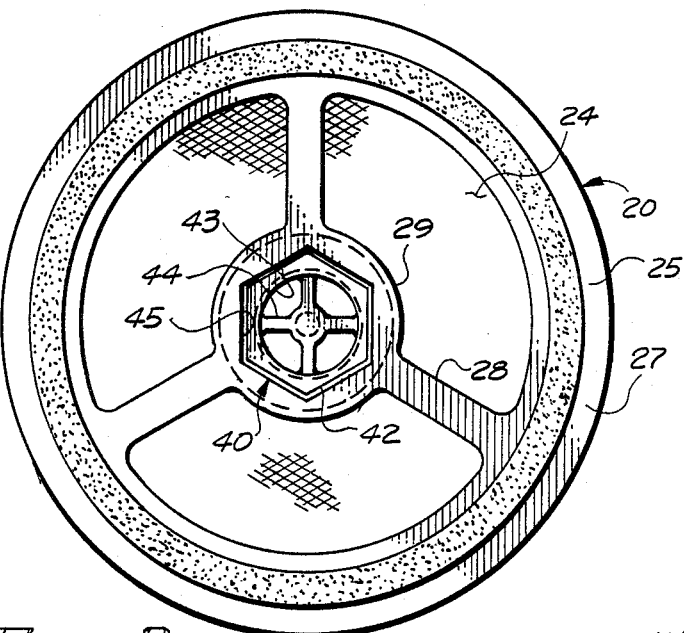
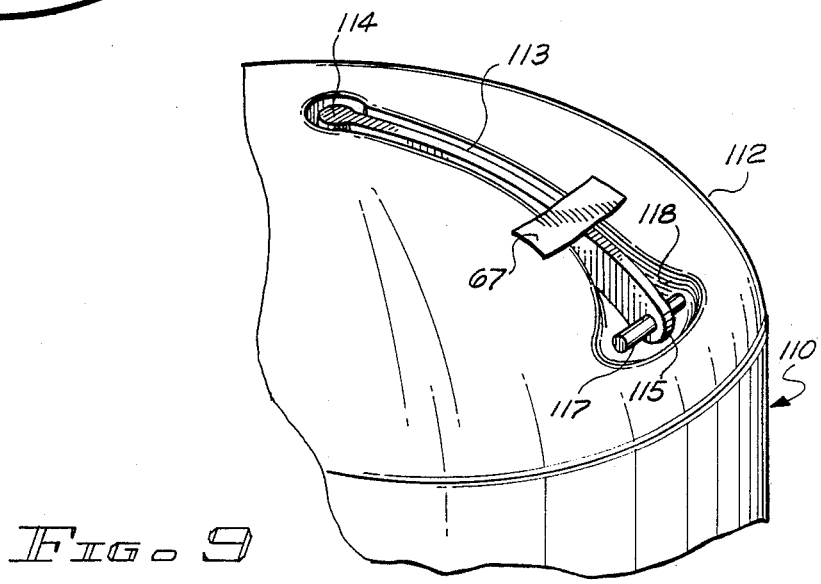

FILTER DEVICE

BACKGROUND OF THE INVENTION

1. Field of the Invention

This invention relates to filters.

More particularly, the present invention relates to filters of the type for removing contaminates from circulating liquid such as the lubricating system of an internal combustion engine.

In a further and more specific aspect, the immediate invention concerns an improved filter device which is readily removable from the filter receiving fitting.

2. The Prior Art

The desirability of installing a filter in certain liquid circulation systems is well established. Exemplary is the lubricating system of an internal combustion engine. As a result of normal functioning, and greatly increased under adverse operating conditions, various contaminates become entrained in the lubricating oil. Removal of foreign material is mandatory to prevent accelerated wear and damage to the mechanism.

The contemporary filter particularly adapted for use in connection with systems of the above type is usually in the form of a self-contained and disposable unit. While commercially available in an array of specific configurations, the typical filter includes a relatively thin walled, cylindrical housing having a closed end and an open end. Carried at the open end are axially located engagement means, generally an internally threaded bore, and a coaxial annular seal. Filter medium, such as fibrous material, reside within the housing.

For detachable securement of the filter, the circulation system is provided with a filter-receiving fitting. Commonly, the fitting includes a liquid outlet nipple and a coaxial sealing surface which receive the engagement means and the annular seal, respectively, of the filter. Accordingly, liquid enters the filter from the nipple, passes through the filter medium and returns through openings intermediate the nipple and the sealing surface.

In response to securement of the engagement means to the nipple, the seal is urged against the sealing surface. Only slight force is required for an effective liquid-tight seal. Sufficient torque is easily generated manually. Removal, however, can be exceedingly troublesome and laborious. Sediment, and other factors, tend to cause the seal to adhere to the sealing surface. Frequently, the bond can be of sufficient strength to render the seal immovable against the surface with the rotational force which can be generated manually. Special tools have been developed for the generation of additional torque. Nevertheless, the application of additional torque is likely to result in rupturing the housing.

Oftentimes a special removal tool is not available. This is especially true in the case of the do-it-yourselfer or home handyman. Therefore, the procedure is accomplished with make shift tools which are even more likely to destroy the integrity of the housing. In either case, rupture of the housing results in an unsightly spill of liquid which necessitates additional laborious effort for clean-up. The fact that the filter may reside in a limited access location further complicates the problem.

It would be highly advantageous, therefore, to remedy the foregoing and other deficiencies inherent in the prior art.

Accordingly, it is an object of the present invention to provide an improved filter device.

Another object of the invention is the provision of improvements to filters of the type commonly used in connection with liquid circulation systems.

And another object of the invention is to provide improvements to filters of the type which include an annular seal and which is rotationally securable to a filter-receiving fitting.

Still another object of the instant invention is the provision of improvements to facilitate removal of a filter from a filter-receiving fitting.

Yet another object of the invention is to provide means for easily severing a bond between a seal and a sealing surface.

Yet still another object of this invention is the provision of a filter device which is readily and conveniently removable without the necessity of tools or special skills.

And a further object of the invention is to provide improvements to preserve the integrity of the filter housing during removal.

Yet a further object of the immediate invention is the provision of improvements which are especially adapted to be incorporated into conventional filters.

Still a further object of the invention is to provide improvements for manual release of a filter without unduly encumbering the device.

And still a further object of the invention are improvements, according to the foregoing, which can be simply and economically practiced.

SUMMARY OF THE INVENTION

The conventional prior art filter device includes a hollow housing having an open end and a closed end and containing filter medium. Engagement means and a coaxial annular seal are carried proximate the open end of the housing. The filter device is especially adapted for use in combination with a liquid circulation system having a filter receiving fitting which includes a liquid outlet nipple, a coaxial sealing surface and a liquid return opening intermediate the nipple and the sealing surface. In response to securement of the engagement means with the nipple, the seal is received against the sealing surface. The instant invention provides improvements for facilitating removal of the filter device from the fitting. Briefly, the improvements include first means moveably coupling the engagement means to the housing and second means for selectively moving the housing relative the engagement means for separating the seal member from the sealing surface.

In a further embodiment, the engagement means are telescopingly coupled to the housing for relative linear movement along an axis which is parallel to the longitudinal axis of the nipple. Also provided are drive means interacting between the housing and the engagement means whereby the engagement means are rotatable in response to rotation of the housing. The second means includes release means normally residing in a first position in which the seal member resides in sealing engagement with a sealing surface and which is movable to a second position in which the seal member is spaced from the sealing surface. Further provided are retention means for retaining the release means in the first position.

More specifically, the release means may be in the form of a lever pivotally carried by the housing and an actuating member interconnecting the lever with the engagement means. The lever normally resides in a retracted position and is movable to an extended position wherein the seal member is separated from the sealing surface. A recess may be formed into the housing for at least partially receiving the lever therein in the retracted position.

In an even more specific embodiment, the first means includes a socket carried by the housing and an engagement member carrying the engagement means and telescopingly residing within the socket. The second means includes a lever pivotally carried by the housing and an actuating member interconnecting the lever with the engagement member for moving the engagement member in a direction toward the open end of the housing as the lever is moved toward the extended position. Preferably, the lever includes a first end moveably coupled to the actuating member and a second end having integral hand grip means. Means intermediate the ends pivotally secure the lever to the housing.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 1 is an elevational view of a filter device incorporating improvements according to the instant invention, portions thereof being broken away for purposes of illustration;

FIG. 2A is an enlarged vertical sectional view taken from the upper right hand portion of FIG. 1 and showing the release means in greater detail as it would appear in the retracted position;

FIG. 2B is a view generally similar to the illustration of FIG. 2A and showing the release means as it would appear during initial movement in a direction toward the extended position;

FIG. 3 is an enlarged fragmentary vertical sectional view taken along the line 3—3 of FIG. 1;

FIG. 4 is an enlarged fragmentary vertical sectional view taken along the line 4—4 of FIG. 2B;

FIG. 5 is an enlarged horizontal fragmentary view taken along the line 5—5 of FIG. 1;

FIG. 6A is a fragmentary vertical sectional view of another filter device incorporating the teachings of the instant invention and especially illustrating alternate release means as it would appear in the retracted position;

FIG. 6B is a view generally similar to the view of FIG. 6A and especially illustrating the release means after having been moved into the extended position;

FIG. 7A is a fragmentary perspective view of an end portion of yet another embodiment of the instant invention illustrating yet another alternately preferred release means as it would appear in the retracted position;

FIG. 7B is a view corresponding to the view of FIG. 7A and showing the release means thereof during initial movement to the extended position;

FIG. 8 is a bottom plan view of the filter device of FIG. 1; and

FIG. 9 is a view generally corresponding to the view of FIG. 7A and illustrating yet another alternately preferred release means as it would appear in the retracted position.

DETAILED DESCRIPTION OF THE PREFERRED EMBODIMENTS

Turning now to the drawings in which like reference characters indicate corresponding elements throughout the several views, attention is first directed to FIG. 1 which illustrates a filter device incorporating the improvements of the instant invention and including a hollow housing, generally designated by the reference character 20, having cylindrical sidewall 22 closed at one end by domed endwall 23. The other end 24, as seen with further reference to FIG. 8, is open. Inturned annular flange 25 supports annular seal 27. Spider or spoked brace 28, carried proximate the open end of sidewall 22, supports centrally located coaxial tubular member 29 having openings 30. Folder medium 32, such as a fibrous material, resides within housing 20.

Within the confines of the foregoing description, the improved filter device of the instant invention is analogous to and shares components with conventional commercially available filter devices. The foregoing is set forth for purposes of orientation and understanding in connection with the ensuing detailed description of the improvements of the instant invention. Details not specifically illustrated and described will be readily apparent to those skilled in the art. It will also be appreciated by those skilled in the art that detachment means, usually an internally threaded bore, is carried by the spoked brace at a central location which is coaxial with the cylindrical sidewall 22 of housing 20.

Filters of the above type are especially adapted for use in removing contaminates from liquid in a liquid circulation system. Exemplary is the oil of the lubricating system of a conventional internal combustion engine. Such circulation systems are provided with a filter receiving fitting to which the device is removably secured. For further purposes of orientation and reference, an exemplary filter receiving fitting is shown in FIG. 1 by the broken outline generally designated by the reference character 35. Typically, filter receiving fitting 35 includes annular sealing surface 37 and perpendicularly extending coaxial nipple 38. The nipple 38 carries engagement receiving means such as an external thread, for securement of the engagement means of the filter. In response to engagement of the engagement means of the filter with engagement receiving means of the nipple, seal 27 is brought into sealing engagement with sealing surface 37. The liquid to be treated enters the filter through nipple 38 as indicated by the arrowed lines A and returns through the opening 39 intermediate nipple 38 and sealing surface 37 as indicated by the arrowed line B. Again, a thorough and complete understanding will be immediately had by those skilled in the art.

The improvements of the instant invention, in accordance with a preferred embodiment thereof as seen with reference to FIGS. 1 and 8, include an engagement member, generally designated by the reference character 40 having outer sidewall 42 and threaded bore 43. Engagement member 40 further includes spider bracket 44, of which further description will be made presently. Socket 45 terminating with shoulder 47 is formed into tubular member 29 from the open end of housing 20.

Engagement member 40 is telescopingly movable within socket 45 along an axis which is substantially parallel to the longitudinal axis of nipple 38 which is indicated by the broken line C. Engagement member 40 is also drivingly engaged with socket 45 such that rotation of housing 20 results in concurrent rotation of engagement member 40. For this purpose, outer sidewall 42 and socket 45 have mating hexagonal cross-sections as specifically illustrated in FIG. 8. Alternate structure for achieving the desired results will readily occur to those skilled in the art. For example, outer sidewall 42 and socket 45 may be cylindrical and drivingly engaged by means of a key carried by one of the elements and a key receiving groove carried by the other.

Tubular guide 48 carrying annular seal 49, such as a convention O-ring, extends into housing 20 from domed endwall 23 as best seen with reference to FIGS. 1 and 2A. Preferably, tubular guide 48 extends along the axis. Recess 50, as seen with additional reference to FIG. 3, is formed into domed endwall 23 to extend substantially radially outward from tubular guide 48. Recess 50 is pressed into endwall 23 to form a pair of spaced apart sidewalls 52 and 53. Lever 54 having inner end 55 and outer end 57 is pivotally affixed to housing 20 by pin 58 carried by sidewalls 52 and 53. Preferably, lever 54 is in the form of a generally U-shaped stamping having depending tabs 59 through which pin 58 passes.

Actuating rod 60 extends through tubular guide 48 and is in fluid-tight engagement with the seal 49. Actuating rod 60 extends from a lower end 62 which is secured to spider bracket 44 to an upper end 63 which is pivotally affixed to the inner end 55 of lever 54 as seen with further reference to FIG. 4 To allow for relative of movement between the members lever 54 is provided with elongate slot 65 which receives pin 64.

FIG. 2A illustrates lever 54 as it would appear in the normal or retracted position wherein outer end 57 lies in closs proximity to the surface of recess 50 and inner end 55 is spaced from endwall 23. Retention member 67 spans recess 50 over lever 54 and normally retrain lever 54 in the retracted position. Retention member 67 may take alternate forms such as a flexible sheet member which is adhesively secured to the surface of endwall 23 or a thin metallic member which is bonded, as by spot welding, to the surface of endwall 23. In either case, retention member 67 is manually removable preferably in response to manually urged movement of outer end 57 in a direction away from recess 50.

Outer end 57 of lever 54, which is preferably upwardly curved, functions as hand grip means to facilitate lifting and pivoting member 54 about pin 58 as indicated by the arcuate arrowed line D in FIG. 2B. In response thereto, inner end 55 moves in the direction indicated by the arcuate arrowed line E. As is obvious, actuating rod 60 is stationary and immovable. Accordingly, housing 20 is lifted, by pin 58, in the direction indicated by the arrowed line F. The movement of housing 20 separates annular seal 27 from sealing surface 37. The manual pressure applied to lever 54 is sufficient to overcome the bonding action between seal 27 and surface 37 as the result of sediment, heat or other factors With the seal thus broken housing 27 is easily manually rotated for disengagement of engagement member 40 from nipple 38.

Reference is now made to FIG. 6 which illustrates an alternate embodiment of the invention including housing 70 having endwall 72 and further including actuating rod 73. Endwall 72 is generally analogous to previously described endwall 23 except for the inclusion of recess 50. Similarly, actuating rod 73 is analogous to previously described actuating rod 60 except that the upper end 74 is terminated by a substantially planar surface. An understanding of further structure not specifically illustrated can be had with reference to the previously described embodiment.

Shown in the retracted position is lever 75 having inner end 77 and outer end 78. Ear 79 projects upwardly from surface 72 at an intermediate location along the length of lever 75. Link 80 is pivotally connected to ear 79 by pin 82 and to lever 75 by pin 83. It is noted that the location of pin 83 is outboard of the location of pin 82. Bail 84 is pivotally carried by a second ear 85 upstanding from surface 72 proximate the outer end 78 of lever 75. Bail 84 engages and retains lever 75 in the retracted position. Arcuate camming surface 87 bears against the end 74 of actuating rod 73.

In preparation for removal of the immediate embodiment of the filter device from the filter receiving fitting, bail 84, which acts as a retention element, is first removed from lever 75 in response to outboard arcuate movement as indicated by the arcuate arrowed line G. End 78 of lever 75 is then manually lifted in a direction indicated by the arcuate arrowed line H urging lever 75 into the extended position as seen in FIG. 6B. During the movement of lever 75, surface 87 of lever 75 cammingly moves against the surface 75 of actuating rod 73. Concurrently, force transmitted through link 80 lifts housing 70 in the direction indicated by the arrowed line I. Accordingly, seal 27 is separated from surface 37 and the removal of the filter device continues as previously described.

A further embodiment of the immediate invention will now be described with reference to FIGS. 7A and 7B. Similar to the previously described embodiments, the immediate embodiment includes a hollow housing, generally designated by the reference character 90 having cylindrical sidewall 92 and a closed end defined by domed endwall 93. The immediate embodiment also includes previously described actuating rod 73 having upper end surface 74. For aspects of the immediate embodiment not specifically illustrated and described, with the exception of the detailed description below, reference is made to the previous embodiments.

Recess 94 is formed into endwall 93 to extend generally radially outward. A pair of opposed tabs 95 project upwardly from surface 93 at an intermediate location along the length of recess 94. A tab 95 resides on either side of recess 94. Lever 97 having inner end 98 and outer end 99 passes between and is pivotally to tabs 95 by pin 100. Arcuate camming surface 102, carried on inner end 98, bears against end 74 of actuating rod 73. Finger ring 103 is carried at outer end 99. Retention member 67, previously described, retains lever 97 in the retracted position as illustrated in FIG. 7A. To move lever 97 to the extended position to separate seal 27 from surface 37, retention member 67 is fractured or removed and outer end 99 lifted, by finger ring 103, in the direction indicated by the arrowed line J. In response to the movement of lever 97, housing 90 moves in a direction indicated by the arrowed line K as previously described, especially in connection with the embodiment of FIGS. 6A and 6B.

Reference is now made to FIG. 9 wherein there is seen an alternate lever structure which for purposes of illustration is shown in combination with a housing generally designated by the reference character 110 having domed endwall 112. In accordance with the immediately preferred, there is provided a lever 113 having inboard end 114 and outboard end 115. T-bar 117, the functional equivalent of finger ring 103, extends perpendicularly through lever 113 proximate end 115.

In the retracted position as shown, lever 113 resides entirely within recess 118 formed in endwall 112. Lever 113 is pivotally connected to endwall 112 by a pin carried by the sidewalls of recess 118 as previously described in connection with the pin 58 specifically seen in FIG. 3. Although not specifically illustrated, inner end 114 of lever 113 is provided with a camming surface such as previously described camming surfaces 87 and 102, for contact with the end 74 of actuating rod 73. As will be appreciated by those skilled in the art, actuating rod 73 is somewhat shortened for use in connection with the immediate embodiment wherein the lever resides entirely within the recess. For an understanding of structure and function not specifically illustrated, reference is made to the previously described embodiments.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described and disclosed the present invention, and alternately preferred embodiments thereof, in such clear and concise terms as to enable those skilled in the art to understand and practice the same, the invention claimed is:

1. In a liquid filter device for use in combination with a filter-receiving fitting,
   which fitting includes a liquid outlet nipple, a coaxial sealing surface, and a liquid return opening intermediate the nipple and the sealing surface, and
   which filter device includes a hollow housing having an open end and a closed end and containing filter medium, engagement means detachably securable with the nipple, and a seal member carried by the housing proximate the open end and sealingly received against the sealing surface in response to securement of the engagement means with the nipple,
   improvements therein for facilitating removal of said filter device from said fitting, said improvements comprising:
   (a) first means moveably coupling said engagement means to said housing; and
   (b) second means for selectively moving said housing relative said engagement means including release means normally residing in a first position in which said seal member resides in sealing engagement with said surface and moveably to a second position in which said seal member is spaced from said surface.

2. The filter device of claim 1, which said second means further includes retention means for retaining said release means in the first means.

3. The filter device of claim 1, wherein said release means includes:
   (a) a lever pivotally carried by said housing;
      said lever normally residing in a retracted position and selectively movable to an extended position; and
   (b) an actuating member interconnecting said lever with said engagement means whereby said housing is moved relative said engagement means to separate said seal member from said surface in response to movement of said lever to said extended position.

4. The filter device of claim 3, wherein said second means further includes retention means for retaining said lever in said retracted position.

5. The filter device of claim 3, further including a recess formed into said housing for at least partially receiving said lever therein.

6. In a liquid filter device for use in combination with a filter-receiving fitting,
   which fitting includes a liquid outlet nipple, a coaxial sealing surface, and a liquid return opening intermediate the nipple and the sealing surface, and
   which filter device includes a hollow housing having an open end and a closed end and containing filter medium, engagement means detachably securable with the nipple, and a seal member carried by the housing proximate the open end and sealingly received against the sealing surface in response to securement of the engagement means with the nipple,
   improvements therein for facilitating removal of said filter device from said fitting, said improvements comprising:
   (a) first means moveably coupling said engagement means to said housing for relative linear movement between said engagement means and said housing along an axis which is parallel to the longitudinal axis of said nipple;
   (b) drive means interacting between said housing and said engagement means whereby said engagement means is rotatable in response to rotation of said housing; and
   (c) second means for selectively moving said housing relative said engagement means whereby said seal member is separated from said sealing surface.

7. The filter device of claim 6, wherein said engagement means is telescopingly carried by said housing.

8. The filter device of claim 6, wherein said second means includes release means normally residing in a first position in which said seal member resides in sealing engagement with said surface and removable to a second position in which said seal member is spaced from said surface.

9. The filter device of claim 8, which said second means further includes retention means for retaining said release means in the first means.

10. The filter device of claim 8, wherein said release means includes:
    (a) a lever pivotally carried by said housing;
       which lever normally residing in a retracted position and selectively movable to an extended position; and
    (b) an actuating member interconnecting said lever with said engagement means whereby said housing is moved relative said engagement means to separate said seal member from said surface in response to movement of said lever to said extended position.

11. The filter of claim 10, wherein said second means further includes retention mean for retaining said lever in said retracted position.

12. The filter device of claim 10, further including a recess formed into said housing for at least partially receiving said lever therein.

13. In a liquid filter device for use in combination with a filter-receiving fitting,
    which fitting invludes a liquid outlet nipple, a coaxial sealing surface, and a liquid return opening intermediate the nipple and the sealing surface, and which filter device includes a hollow housing having an open end and a closed end and containing filter medium, engagement means detachably securable with the nipple, and a seal member carried by the housing proximate the open end and sealingly received against the sealing surface in response to securement of the engagement means with the nipple, improvements therein for facilitating removal of said filter device from said fitting, said improvements comprising:

(a) first means moveably coupling said engagement means to said housing including;
 (i) a socket carried by said housing, and
 (ii) an engagement member carrying said engagement means telescopingly residing within said socket; and
(b) second means for selectively moving said housing relative said engagement means whereby said seal member is separated from said sealing surface including:
 (i) a lever pivotally carried by said housing said lever normally in a retracted position and selectively movable to an extended position,
 (ii) an actuating member interconnecting said lever with said engagement member for moving said engagement member in a direction toward the open end of said housing as said lever is moved toward said extended position.

14. The filter device of claim 13, wherein said lever includes:

(a) a first end moveably coupled to said actuating member;
(b) a second end having integral hand grip means; and
(c) means intermediate said end for pivotal securement to said housing.

15. The filter device of claim 14, further including retention means for retaining said lever in said retracted position.

* * * * *